US012784036B2

(12) United States Patent
Rawat et al.

(10) Patent No.: US 12,784,036 B2
(45) Date of Patent: Nov. 3, 2026

(54) IDENTIFYING EXPIRING CODE VERIFICATION CERTIFICATES IN CUSTOMER PREMISES EQUIPMENT DEVICES

(71) Applicant: Charter Communications Operating, LLC, St. Louis, MO (US)

(72) Inventors: Deependra Singh Rawat, Highlands Ranch, CO (US); Vinod Dani, Littleton, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 267 days.

(21) Appl. No.: 18/461,207

(22) Filed: Sep. 5, 2023

(65) Prior Publication Data

US 2025/0078067 A1 Mar. 6, 2025

(51) Int. Cl.

| | |
|---|---|
| ***G06F 21/64*** | (2013.01) |
| ***G06F 21/51*** | (2013.01) |
| ***G06Q 20/38*** | (2012.01) |
| *G06F 21/44* | (2013.01) |
| *G06F 21/50* | (2013.01) |

(52) U.S. Cl.
CPC .............................. *G06Q 20/38215* (2013.01)

(58) Field of Classification Search
None
See application file for complete search history.

(56) References Cited

U.S. PATENT DOCUMENTS

| | | | | |
|---|---|---|---|---|
| 10,003,458 | B2 * | 6/2018 | Ylonen | H04L 9/08 |
| 2004/0093492 | A1 * | 5/2004 | Daude | H04L 63/0823 726/15 |
| 2008/0046752 | A1 * | 2/2008 | Berger | H04L 9/3271 713/186 |
| 2015/0319142 | A1 * | 11/2015 | Herberg | H04L 9/3228 713/171 |
| 2017/0230185 | A1 * | 8/2017 | Varadhan | H04L 9/14 |
| 2017/0366395 | A1 * | 12/2017 | Goldfarb | H04L 43/08 |
| 2018/0139060 | A1 * | 5/2018 | Lin | H04L 9/3226 |

(Continued)

OTHER PUBLICATIONS

Malware Detection Vectors and Analysis Techniques: A Brief Survey. Deka et al. IEEE. (Year: 2016).*

(Continued)

*Primary Examiner* — Venkat Perungavoor
(74) *Attorney, Agent, or Firm* — Dority & Manning, P.A.

(57) ABSTRACT

A computing device accesses, from a storage device, a plurality of public keys. The computing device generates, for each public key of the plurality of public keys, a code verification certificate (CVC). The computing device extracts, from each CVC, information associated with each CVC. The computing device obtains, for each respective customer premises equipment (CPE) device of a plurality of CPE devices, a corresponding configuration file of a plurality of configuration files. The computing device extracts, from each respective configuration file of the plurality of configuration files, a CPE-assigned CVC used by the CPE device corresponding to the respective configuration file. The computing device performs a comparison of the information associated with each CVC and information associated with each CPE-assigned CVC. The computing device generates one or more notifications based the comparison.

21 Claims, 5 Drawing Sheets

(56) References Cited

U.S. PATENT DOCUMENTS

| | | | | |
|---|---|---|---|---|
| 2018/0159845 A1* | 6/2018 | Aronov | H04L 63/0435 | |
| 2019/0075168 A1* | 3/2019 | Goldfarb | H04L 63/0272 | |
| 2022/0173966 A1* | 6/2022 | Hill | H04L 67/34 | |
| 2023/0319018 A1* | 10/2023 | Gourlay | H04L 63/0823 | 713/168 |

OTHER PUBLICATIONS

Remote Attestation on Program Execution. Gu et al. ACM. (Year: 2008).*
Detection of Packed Malware. Devi et al. ACM. (Year: 2012).*
Remote Attestation on Program Execution. Tian-Yang et al. (Year: 2010).*

* cited by examiner

IDENTIFYING EXPIRING CODE VERIFICATION CERTIFICATES IN CUSTOMER PREMISES EQUIPMENT DEVICES

BACKGROUND

Customer premises equipment devices use code verification certificates to provide security for the devices. The code verification certificates may be expiring, however certificates and the private keys for the certificates are stored in off-air devices, which requires manually checking whether a certificate is expiring and determining which customer premises equipment devices use the expiring certificate.

SUMMARY

The examples disclosed herein implement the identification and presentation of expiring code verification certificates in customer premises equipment devices. In particular, public keys can be obtained and used to generate code verifications certificates. Configuration files for the customer premises equipment devices can be obtained and code verification certificates for the customer premises equipment devices can be extracted from the configuration files. Based on the code verification certificates from the public keys and the code verification certificates from the customer premises equipment device configuration files, notifications indicating which of the certificates are expiring and the customer premises equipment devices with the expiring certificates can be generated.

In one example, a method for identifying expiring code verification certificates in customer premises equipment devices is provided. The method includes accessing, by a computing device from a storage device, a plurality of public keys. The method further includes generating, by the computing device, for each public key of the plurality of public keys, a code verification certificate (CVC). The method further includes extracting, by the computing device from each CVC, information associated with each CVC. The method further includes obtaining, by the computing device, for each respective customer premises equipment (CPE) device of a plurality of CPE devices, a corresponding configuration file of a plurality of configuration files. The method further includes extracting, by the computing device from each respective configuration file of the plurality of configuration files, a CPE-assigned CVC used by the CPE device corresponding to the respective configuration file. The method further includes performing, by the computing device, a comparison of the information associated with each CVC and information associated with each CPE-assigned CVC. The method further includes generating, by the computing device, one or more notifications based on the comparison.

In another example, a computing device for identifying expiring code verification certificates in customer premises equipment devices is provided. The computing device includes a memory and a processor device coupled to the memory. The processor device is to access, from a storage device, a plurality of public keys. The processor device is further to generate, for each public key of the plurality of public keys, a code verification certificate (CVC). The processor device is further to extract, from each CVC, information associated with each CVC. The processor device is further to obtain, for each respective customer premises equipment (CPE) device of a plurality of CPE devices, a corresponding configuration file of a plurality of configuration files. The processor device is further to extract, from each respective configuration file of the plurality of configuration files, a CPE-assigned CVC used by the CPE device corresponding to the respective configuration file. The processor device is further to perform a comparison of the information associated with each CVC and information associated with each CPE-assigned CVC. The processor device is further to generate one or more notifications based on the comparison.

In another example, a non-transitory computer-readable storage medium for identifying expiring code verification certificates in customer premises equipment devices is provided. The non-transitory computer-readable storage medium includes computer-executable instructions to cause a processor device to access, from a storage device, a plurality of public keys. The instructions further cause the processor device to generate, for each public key of the plurality of public keys, a code verification certificate (CVC). The instructions further cause the processor device to extract, from each CVC, information associated with each CVC. The instructions further cause the processor device to obtain, for each respective customer premises equipment (CPE) device of a plurality of CPE devices, a corresponding configuration file of a plurality of configuration files. The instructions further cause the processor device to extract, from each respective configuration file of the plurality of configuration files, a CPE-assigned CVC used by the CPE device corresponding to the respective configuration file. The instructions further cause the processor device to perform a comparison of the information associated with each CVC and information associated with each CPE-assigned CVC. The instructions further cause the processor device to generate one or more notifications based on the comparison.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
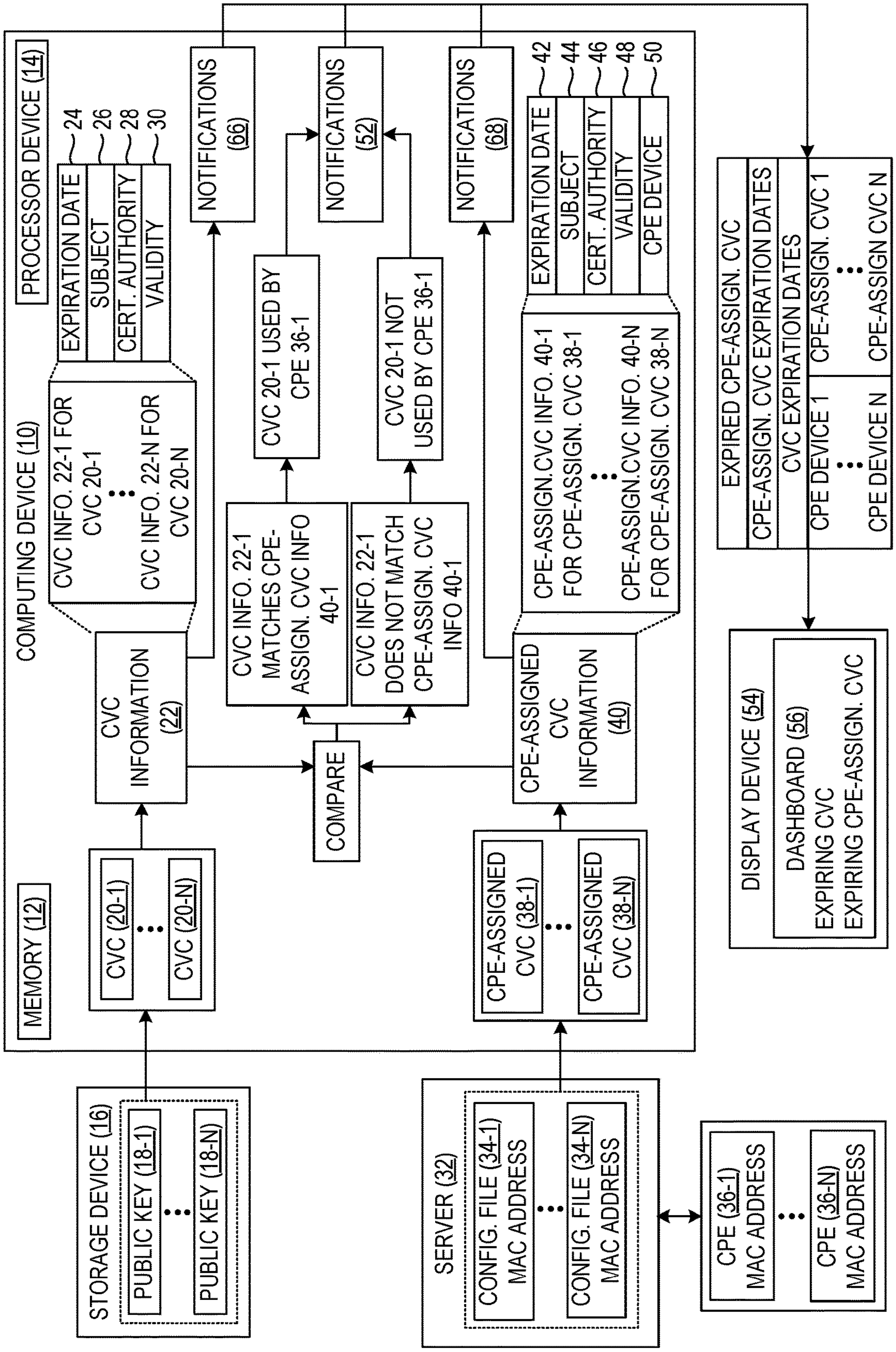
FIG. 1 is a block diagram of a computing device in which examples of identifying expiring code verification certificates in customer premises equipment devices may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Customer premises equipment (CPE) devices are telecommunication devices located on a customer's premises that are connected to a carrier's telecommunication network. A CPE device may be a router, modem, residential gateway, set-top-box, network switch, telephone, or other networking equipment located in a customer's home or business and connected to a telecommunication company's network. For instance, a service operator may have millions of field-deployed access CPE devices, such as residential modems and Service Optical Network Unit (S-ONU) devices, which may be provided by vendors.

Security specifications of these CPE devices may require the use of code verification certificates (CVCs) for code update, which may be used by a vendor of a CPE device and by the telecommunication company for co-signing. A CVC is a digital certificate issued by a Certificate Authority that includes a public key and can be used to digitally sign code to allow for authentication of the source of the code and ensure that the code has not been tampered with. A developer of the code can apply their private key to the code to create a digital signature that is unique to the code, and when a user runs the code, the digital signature is checked by using the public key in the CVC. A CVC is valid for a limited time period, such as 1-3 years, and new signatures cannot be created with the CVC upon the expiration of the CVC.

CPE devices use CVCs to provide security for the CPE devices. The CVCs may be expiring, however CVCs and the private keys for the CVCs are often stored in off-air devices, which requires manually checking whether a CVC is expiring or expired and determining which CPE devices use the expiring or expired CVC. A service operator may have millions of CPE devices in use, resulting in the time-consuming process of manually determining which of the millions of CPE devices are using expiring or expired CVCs.

The examples disclosed herein implement the identification and presentation of expiring CVCs in CPE devices. In particular, public keys can be obtained and used to generate CVCs. Configuration files for the CPE devices can be obtained and CVCs for the CPE devices can be extracted from the configuration files. Based on the CVCs from the public keys and the CVCs from the CPE device configuration files, notifications indicating which of the CVCs are expiring or expired and the CPE devices with expiring or expired CVCs can be generated and displayed.

The configuration files for the CPE devices can be obtained from a server that contains the configuration files for the CPE devices. In some implementations, the configuration file for a CPE device may be included within the CPE device. When the configuration file is included in the CPE device, a main processor of the CPE device may make a remote procedure call to another processor of the CPE device to get the configuration file. Once the configuration files are obtained from the server or the CPE device, the CVCs for the CPE devices can be extracted from the configuration files.

FIG. 1 is a block diagram of a computing device 10 that comprises a system memory 12 and a processor device 14 in which examples of identifying expiring code verification certificates in customer premises equipment devices may be practiced. It is to be understood that the computing device 10 in some examples may include constituent elements in addition to those illustrated in FIG. 1. Functionality implemented by the computing device 10 may be attributed herein to the processor device 14. It is to be further understood that while, for purposes of illustration only, the computing device 10 is depicted as a single component, the functionality implemented by the computing device 10 may be implemented in any number of components, and the examples discussed herein are not limited to any particular number of components In the example of FIG. 1, the computing device 10 performs identifying expiring code verification certificates in customer premises equipment devices.

The computing device 10 may access a storage device 16 that contains a plurality of public keys 18-1-18-N (collectively, public keys 18). The storage device 16 may be an internal or external hard disk drive of the computing device 10, an external database, a provisioning system that stores public keys, or another component capable of storing public keys. The computing device 10 may obtain the public keys 18 and generate code verification certificates (CVC) 20-1-20-N (collectively, CVCs 20) for the public keys 18. The public keys 18 may be obtained periodically or within a predetermined time period, such as a day or a week. A CVC may be generated for each public key of the public keys 18. For instance, the public keys 18, which may be in hexadecimal format, can each be converted to the appropriate certificate format from the existing hexadecimal format, such as by using the OpenSSL library as one example, to generate each of the CVCs 20 so that the CVCs 20 can be read. CVC information 22 that is associated with each of the CVCs 20 generated from the public keys 18 can be extracted from each of the CVCs 20. Each of the CVCs 20 can have corresponding CVC information 22 that includes one or more of an expiration date 24, a subject 26, a certificate authority 28, or a validity 30 of the respective CVC of the CVCs 20. The computing device 10 can determine the CVC information 22 by parsing the CVCs 20 for the expiration date 24, the subject 26, the certificate authority 28, and/or the validity 30, as non-limiting examples, of each CVC of the CVCs 20. The computing device 10 can determine that a CVC is expired based on the expiration date 24 of the CVC when the expiration date 24 is a date prior to the current date. When the CVC is not expired, the computing device 10 can determine whether the CVC is expiring within a predetermined time period (e.g., within the next week) based on the predetermined time period, the current date, and the expiration date 24 of the CVC. In some examples, notifications 66 may be generated by the computing device 10 that identify the CVCs that are expired and any CVCs that are expiring within the predetermined time period. The notifications 66 can be sent by the computing device 10 to a display device 54 for display on a dashboard 56 of a user interface image that displays the information contained in the notifications 66.

Once the computing device 10 determines which CVCs of the CVCs 20 are expired or expiring, the customer premises equipment (CPE) devices which are using the expired or expiring CVCs can be determined. The computing device 10 may access a server 32 and obtain a configuration file from among a plurality of configuration files 34-1-34-N (collectively, configuration files 34) for each CPE device of a plurality of CPE devices 36-1-36-N (collectively, CPE devices 36) from the server 32 which stores the configuration files 34. The configuration files 34 may be obtained periodically or within a predetermined time period, such as a day or a week. The server 32 may contain a configuration file for each CPE device and the configuration files may include information about the corresponding CPE device, such as the MAC address of the CPE device that the configuration file is for. For example, the computing device 10 may access the server 32, obtain the configurations files 34 from the server 32, and identify a configuration file of the configuration files 34 that corresponds to a CPE device of the CPE devices 36 based on the MAC address of the CPE device, such as by matching the MAC address of the CPE device to the MAC address in the configuration file. Each CPE device of the CPE devices 36 can have one configuration file in the server 32 and the computing device 10 may access the server 32 by making one call to the server 32 for each CPE device of the CPE devices 36 in order to obtain the configuration file for the respective CPE device.

A CPE-assigned CVC that is used by a CPE device of the CPE devices 36 can be extracted from the configuration file that corresponds to the CPE device. The configuration file that corresponds to a CPE device can include the CVC that is used by the CPE device (i.e., the CPE-assigned CVC). A CPE-assigned CVC that is used by a CPE device can be extracted from each of the configuration files 34, resulting in a plurality of CPE-assigned CVCs 38-1-38-N (collectively, CPE-assigned CVCs 38), each CPE-assigned CVC of the CPE-assigned CVCs 38 being used by a CPE device of the CPE devices 36 and each CPE device corresponding to a configuration file of the configuration files 34.

CPE-assigned CVC information 40 that is associated with each of the CPE-assigned CVCs 38 can be extracted from each of the CPE-assigned CVCs 38. Each of the CPE-assigned CVCs 38 can have corresponding CPE-assigned CVC information 40 that includes one or more of an expiration date 42, a subject 44, a certificate authority 46, a validity 48, or a corresponding CPE device 50 of the respective CPE-assigned CVC of the CPE-assigned CVCs 38. The computing device 10 can determine the CPE-assigned CVC information 40 by parsing the CPE-assigned CVCs 38 for the expiration date 42, the subject 44, the certificate authority 46, the validity 48, and the corresponding CPE device 50, as non-limiting examples, of each CPE-assigned CVC of the CPE-assigned CVCs 38. The computing device 10 can determine that a CPE-assigned CVC of the CPE-assigned CVCs 38 is expired based on the expiration date 42 of the CPE-assigned CVC when the expiration date 42 is a date prior to the current date. When the CPE-assigned CVC is not expired, the computing device 10 can determine whether the CPE-assigned CVC is expiring within a predetermined time period (e.g., within the next week or month) based on the predetermined time period, the current date, and the expiration date 42 of the CPE-assigned CVC. In some examples, notifications 68 may be generated by the computing device 10 that identify the CPE-assigned CVCs that are expired and any CPE-assigned CVCs that are expiring within the predetermined time period. The notifications 68 can be sent by the computing device 10 to the display device 54 for display on the dashboard 56 of a user interface image that displays the information contained in the notifications 68.

Once the CVCs 20 and the CPE-assigned CVCs 38 are obtained, the computing device 10 can determine whether the CVCs 20 are being used by the CPE devices 36. For instance, some of the CVCs 20 may not be in use by any CPE device, so an operator may want to remove from the storage device 16 the public keys 18 that the unused CVCs 20 were generated from. In order to determine whether the CVCs 20 are being used by the CPE devices 36, the computing device 10 may perform a comparison of the CVC information 22 that is associated with each of the CVCs 20 and the CPE-assigned CVC information 40 that is associated with each of the CPE-assigned CVCs 38.

The comparison may include determining that the CVC information 22 that is associated with a CVC of the CVCs 20 matches the CPE-assigned CVC information 40 that is associated with a CPE-assigned CVC of the CPE-assigned CVCs 38. When the CVC information 22 that is associated with a CVC of the CVCs 20 matches the CPE-assigned CVC information 40 that is associated with a CPE-assigned CVC of the CPE-assigned CVCs 38, the computing device 10 can determine that the CVC is used by the CPE device that uses the CPE-assigned CVC.

The comparison may include determining that the CVC information 22 that is associated with a CVC of the CVCs 20 does not match the CPE-assigned CVC information 40 that is associated with a CPE-assigned CVC of the CPE-assigned CVCs 38. When the CVC information 22 that is associated with a CVC of the CVCs 20 does not match the CPE-assigned CVC information 40 that is associated with a CPE-assigned CVC of the CPE-assigned CVCs 38, the computing device 10 can determine that the CVC is not used by the CPE device that uses the CPE-assigned CVC.

For example, the computing device 10 may have pulled six public keys 18 from the storage device 16 and generated six CVCs 20 from the public keys 18, and pulled 3 million configurations files 34 from the server 32 corresponding to 3 million CPE devices 36. The computing device 10 can extract the CVC information 22 from the six CVCs 20 and the CPE-assigned CVC information 40 from the 3 million CPE-assigned CVCs 38 extracted from the configuration files 34. The computing device 10 can then compare the CVC information 22 and the CPE-assigned CVC information 40 to determine which of the CVCs 20 are being used by the CPE devices 36. Based on the comparison, the computing device 10 may determine that none of the CPE devices 36 are using one of the six CVCs 20 because none of the CPE-assigned CVC information 40 matches the CVC information 22 that corresponds to the CVCs 20 generated from the six public keys 18. As a result, a notification identifying the CVC that is not used by any of the CPE devices 36 can be generated and sent by the computing device 10 to a display device for display on a dashboard of a user interface image that displays the information contained in the notification. Based on the comparison, the computing device 10 may determine that the remaining five of the six CVCs 20 are being used by the CPE devices 36 because the CPE-assigned CVC information 40 matches the CVC information 22 that corresponds to the CVCs 20 generated from the five remaining public keys 18. As a result, a notification identifying the CPE devices 36 and the CVCs 20 that the CPE devices 36 are using can be generated and sent by the computing device 10 to a display device for display on a dashboard of a user interface image that displays the information contained in the notification.

When a CVC is being used by a CPE device (i.e., the CVC information 22 matches the CPE-assigned CVC information 40 for the CPE device), the expiration date of the CVC can be determined by parsing the CVC for the expiration date of the CVC. When the expiration date is a date prior to the current date, then the CVC is expired. When the CVC is not expired, the computing device 10 can determine whether the CVC is expiring within a predetermined time period (e.g., within the next week or month) based on the predetermined time period, the current date, and the expiration date of the CVC. Notifications may be generated by the computing device 10 that identify the CVC that is expired and any CVCs that are expiring within the predetermined time period, as well as the CPE devices that are using the expired or expiring CVCs. The notifications can be sent by the computing device 10 to a display device for display on a dashboard of a user interface image that displays the information contained in the notifications. In some examples, the computing device 10 may send a command to the storage device 16 to delete from the storage device 16 the public key 18 that the expired CVC was generated from.

The computing device 10 can generate one or more notifications 52 based on the comparison. In some implementations, the notifications 52 may include a notification indicating that a CPE-assigned CVC of the CPE-assigned CVCs 38 is expired, which can be generated when the computing device 10 determines that the CPE-assigned CVC is expired. The notifications 52 can also include the Certificate Authority of each CVC of the CVCs 20 and each CPE-assigned CVC of the CPE-assigned CVCs 38, an expiration date of each CVC of the CVCs 20 and each CPE-assigned CVC of the CPE-assigned CVCs 38, and/or a list of each CPE device of the CPE devices 36 and a corresponding CVC of the CVCs 20 and/or CPE-assigned CVC of the CPE-assigned CVCs 38 for the respective CPE device along with the expiration date of the CVC and/or CPE-assigned CVC.

A display device 54 can display a dashboard 56 based on the notifications 52. For instance, the computing device 10 may send the notifications 52 to the display device 54 and the dashboard 56 may be a user interface image that displays the information contained in the notifications 52, such as the Certificate Authority of each CVC and each CPE-assigned CVC, the expiration date of each CVC and each CPE-assigned CVC, and/or the list of each CPE device of the CPE devices 36 and the corresponding CVC of the CVCs 20 and/or CPE-assigned CVC of the CPE-assigned CVCs 38 for the respective CPE device along with the expiration date of the CVC and/or CPE-assigned CVC. The dashboard 56 can also include a list of each CVC of the CVCs 20 and each CPE-assigned CVC of the CPE-assigned CVCs 38 that is used by a CPE device and that is expired or scheduled to expire with in a period of predetermined time, such as 1 week, to allow for a user to replace the expired or expiring CVCs and/or CPE-assigned CVCs. A user may set the predetermined time period to check for CVCs that are expiring within that time period, such as 1 month. The notifications 52 may identify the CPE devices 36 with the CPE device's MAC address in order for a user to identify the CPE devices 36 and the CPE devices 36 that are using expired or expiring CVCs on the dashboard 56 of the display device 54. The notifications 52 may also identify the Certificate Authority of the expired or expiring CVCs and/or CPE-assigned CVCs to display on the dashboard 56 in order for the user to know where to get a new CVC for the CPE device. The dashboard 56 may additionally flag the CPE devices 36 that are using expired or expiring CVCs in order for a user to be able to easily identify such CPE devices which need updated CVCs with later expiration dates.

Figure 2:
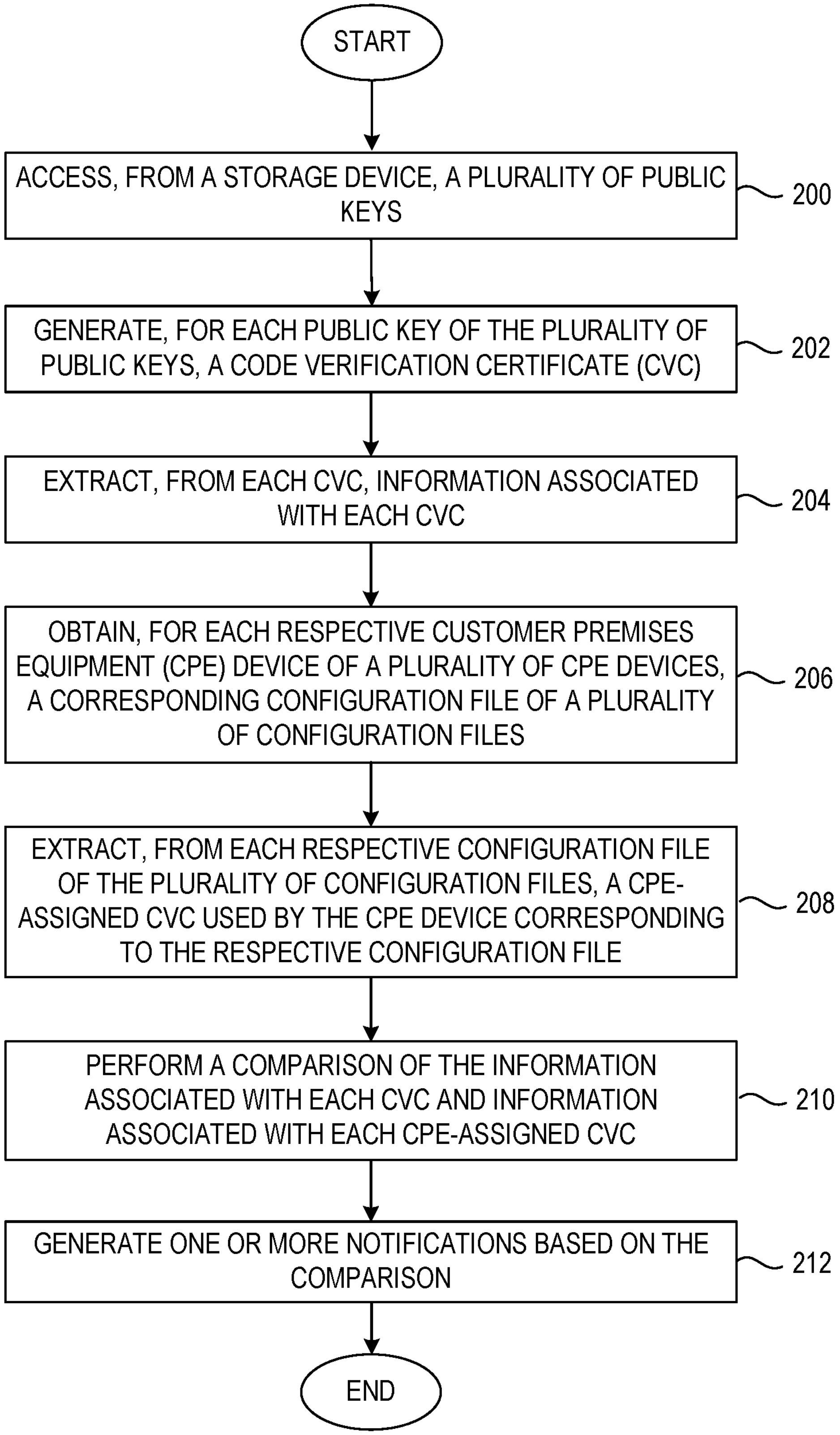
FIG. 2 is a flowchart illustrating operations performed by the computing device of FIG. 1 for identifying expiring code verification certificates in customer premises equipment devices, according to one example.

FIG. 2 is a flowchart illustrating operations performed by the computing device of FIG. 1 for identifying expiring code verification certificates in customer premises equipment devices and code verification certificates in storage device, according to one example. Elements of FIG. 1 are referenced in describing FIG. 2 for the sake of clarity. In FIG. 2, operations begin with a processor device of a computing device, such as the processor device 14 of the computing device 10 of FIG. 1, the processor device 14 to access, from a storage device, a plurality of public keys (block 200). The processor device 14 is further to generate, for each public key of the plurality of public keys, a code verification certificate (CVC) (block 202). The processor device 14 is further to extract, from each CVC, information associated with each CVC (block 204). The processor device 14 is further to obtain, for each respective customer premises equipment (CPE) device of a plurality of CPE devices, a corresponding configuration file of a plurality of configuration files (block 206). The processor device 14 is further to extract, from each respective configuration file of the plurality of configuration files, a CPE-assigned CVC used by the CPE device corresponding to the respective configuration file (block 208). The processor device 14 is further to perform a comparison of the information associated with each CVC and information associated with each CPE-assigned CVC (block 210). The processor device 14 is further to generate one or more notifications based on the comparison (block 212).

Figure 3:
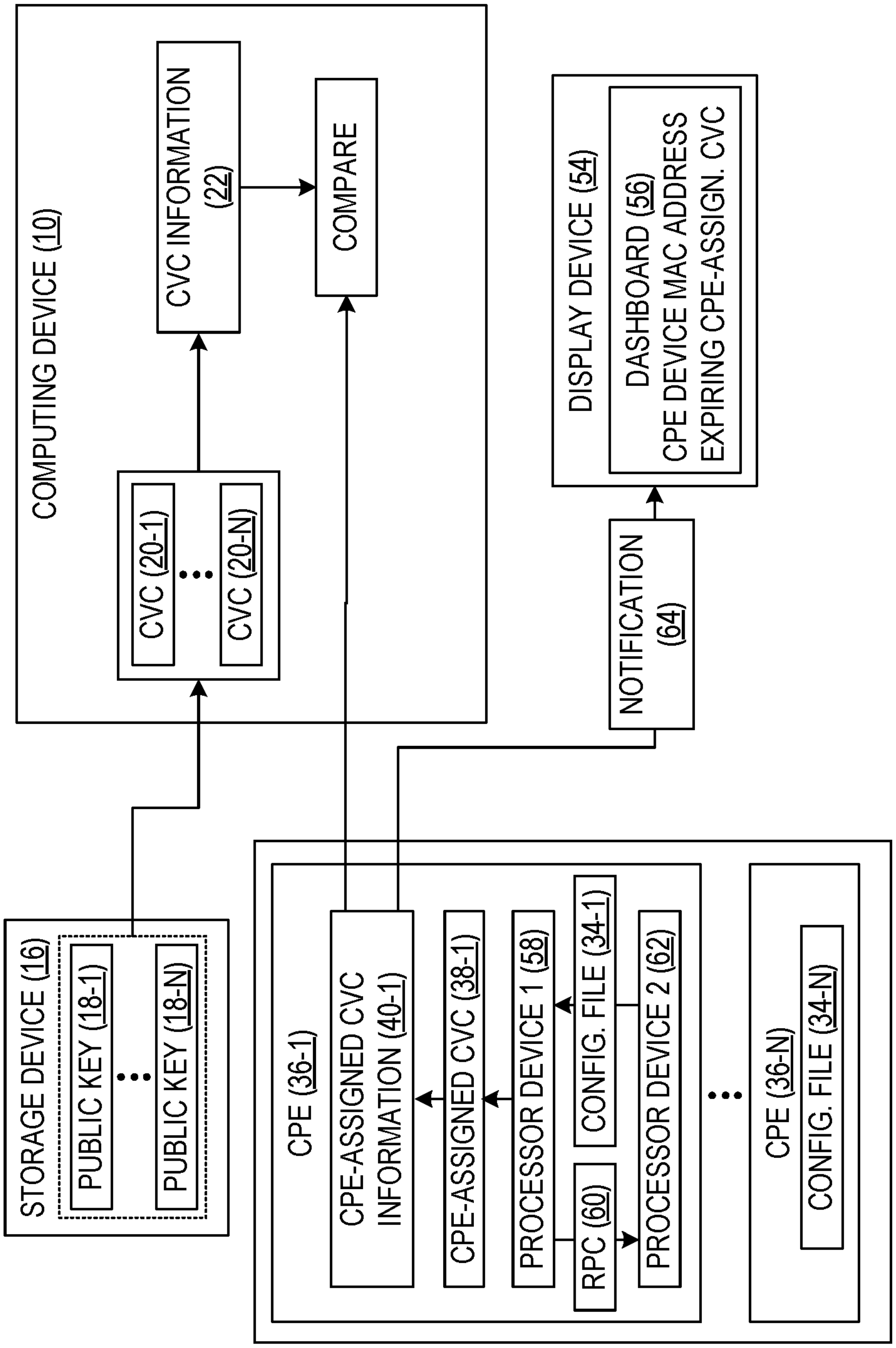
FIG. 3 is a block diagram of the computing device of FIG. 1 for identifying expiring code verification certificates in customer premises equipment devices, according to one example.

FIG. 3 is a block diagram of the computing device of FIG. 1 for identifying expiring code verification certificates in customer premises equipment devices, according to one example. Elements of FIG. 1 are referenced in describing FIG. 3 for the sake of clarity. In the example of FIG. 3, a first processor device 58 of a CPE device from among the CPE devices 36 (e.g., CPE device 36-1) can make a remote procedure call 60 to a second processor device 62 of the CPE device 36-1 to get configuration file 34-1 for the CPE device 36-1. The first processor device 58 may be a main processor of the CPE device 36-1 and the second processor device 62 may be a cable modem processor of the CPE device as one example. For instance, an API request may be sent from the first processor device 58 to the second processor device 62 requesting the configuration file 34-1. Prior to making the remote procedure call 60 for the configuration file 34-1, the CPE device 36-1 can check whether the configuration file 34-1 has already been obtained from the second processor device 62, and when the configuration file 34-1 has already been obtained (i.e., the first processor device 58 has the configuration file 34-1) then the remote procedure call 60 is not made.

In response to the remote procedure call 60, the first processor device 58 may receive the configuration file 34-1, such as in an API response, and extract the CPE-assigned CVC (e.g., CPE-assigned CVC 38-1) and the information associated with the CPE-assigned CVC 38-1 (e.g., CPE-assigned CVC information 40-1) from the configuration file 34-1. For instance, the CPE device 36-1 can parse the configuration file 34-1 to get the CPE-assigned CVC information 40-1 associated with the CPE-assigned CVC from the configuration file 34-1. The CPE device 36-1 may send the CPE-assigned CVC information 40-1 to the computing device 10. Once the CVCs 20 are obtained and the CPE-assigned CVC information 40-1 is obtained from the CPE device 36-1, the computing device 10 can determine whether the CVCs 20 are being used by the CPE device 36-1 by performing the comparison of the CVC information 22 that is associated with each of the CVCs 20 and the CPE-assigned CVC information 40-1 that is sent by the CPE device 36-1.

The CPE device 36-1 may read the CPE-assigned CVC information 40-1 associated with the CPE-assigned CVC 38-1 to determine the expiration date of the CPE-assigned CVC 38-1. The CPE device 36-1 can determine that the CPE-assigned CVC 38-1 is expired based on the expiration date when the expiration date is a date prior to the current date, or that the CPE-assigned CVC 38-1 is expiring within a predetermined time period (e.g., within the next week or month) based on the predetermined time period, the current date, and the expiration date. A notification 64 that includes the CPE-assigned CVC information 40-1 associated with the CPE-assigned CVC 38-1 (e.g., the expiration date of the CPE-assigned CVC 38-1) may be sent by the CPE device 36-1 to the display device 54 with the dashboard 56. The notification 64 may identify the CPE device 36-1 (e.g., by the MAC address), the CPE-assigned CVC that is expiring or expired, and the Certificate Authority of the CPE-assigned CVC that is expiring or expired. In some implementations, a timer may be used for the CPE device 36-1 to determine the CPE-assigned CVC information 40-1 associated with the CPE-assigned CVC 38-1 and expiration details and to send the notification 64 or message with such information to the display device 54 with the dashboard 56.

In some examples, the computing device 10 may use the CVC information 40-1 to perform the comparison of the CVC information 22 and the CVC information 40. The computing device 10 may generate the CVCs 20 for the public keys 18, extract the CVC information 22 from the CVCs 20, obtain the configuration files 34 for some of the CPE devices 36 from the server 32, extract the CPE-assigned CVCs 38 and the CPE-assigned CVC information 40 from the configuration files 34, perform the comparison, and generate the notifications 52 for some of the CPE devices 36. For the remaining CPE devices 36, the first processor device 58 of the respective CPE device may obtain the configuration file for the respective CPE device from the second processor device 62 of the respective CPE device, extract the CPE-Assigned CVC and CPE-assigned CVC information from the configuration file for the respective CPE device, and generate and send the notification 64.

As a result, less calls to the server 32 with the configuration files 34 for the CPE devices 36 can be made by the computing device 10 because one or more of the CPE devices 36 can determine the CPE-assigned CVC information from the configuration file of the respective CPE devices instead of the respective configuration file in the server 32. The overhead of the computing device 10 to extract the CPE-assigned CVCs 38 from the configuration files 34 can also be reduced as a result.

Figure 4:
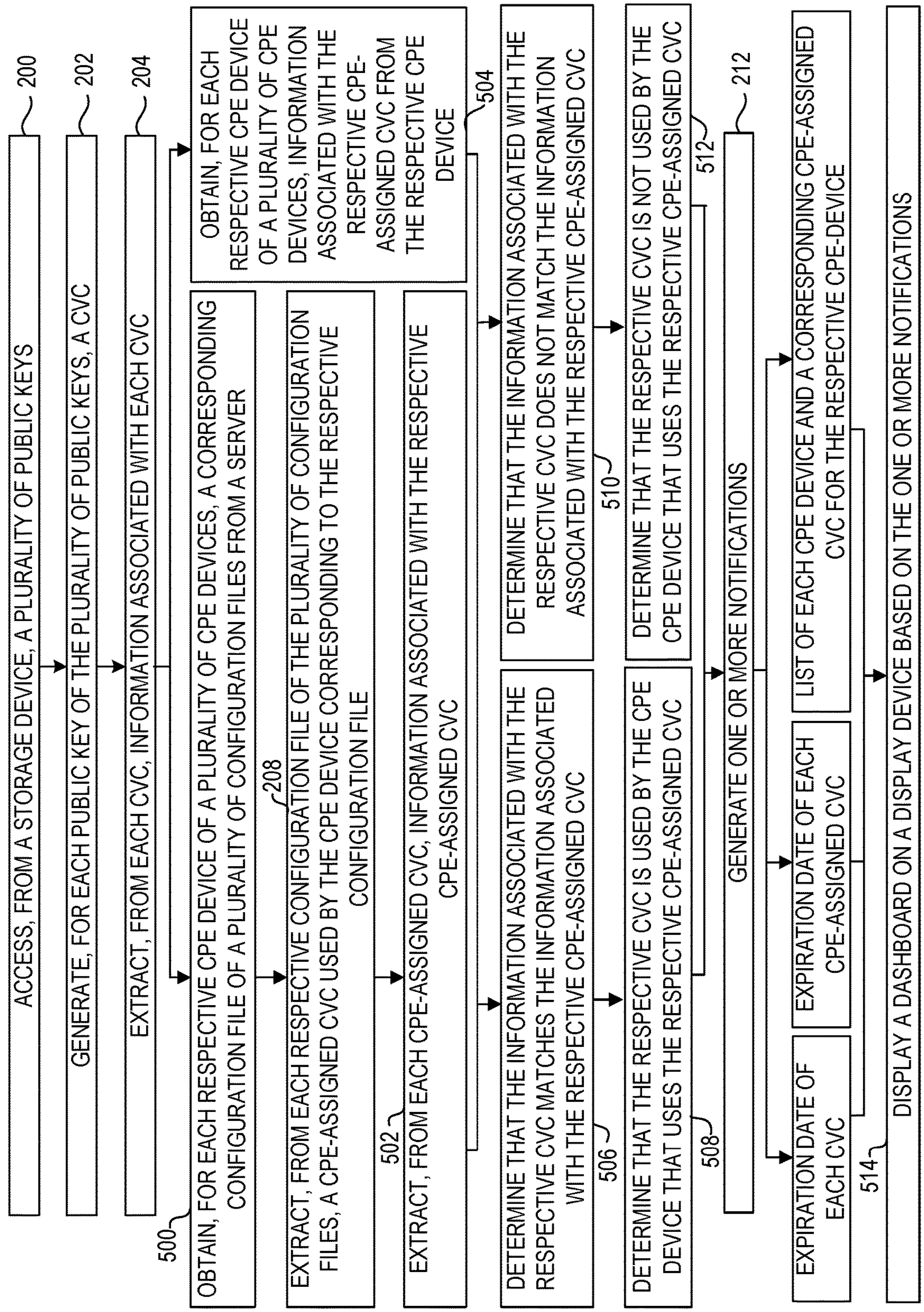
FIG. 4 is a flowchart illustrating operations performed by the computing device of FIG. 1 for identifying expiring code verification certificates in customer premises equipment devices, according to one example.

FIG. 4 is a flowchart illustrating operations performed by the computing device of FIG. 1 for identifying expiring code verification certificates in customer premises equipment devices, according to one example. Elements of FIG. 1 are referenced in describing FIG. 4 for the sake of clarity. In the example of FIG. 4, the operations begin with the computing device 10 to access, from a storage device, a plurality of public keys (block 200). The computing device 10 can generate, for each public key of the plurality of public keys, a code verification certificate (CVC) (block 202). The computing device 10 may extract, from each CVC, information associated with each CVC (block 204).

In some implementations, the computing device 10 may obtain, for each respective customer premises equipment (CPE) device of a plurality of CPE devices, a corresponding configuration file of a plurality of configuration files from a server (block 500). The operations continue with computing device 10 to extract, from each respective configuration file of the plurality of configuration files, a CPE-assigned CVC used by the CPE device corresponding to the respective configuration file (block 208). The computing device 10 can extract, from each CPE-assigned CVC, information associated with the respective CPE-assigned CVC (block 502). In other implementations, the computing device 10 may obtain, for each respective customer premises equipment (CPE) device of a plurality of CPE devices, a information associated with the respective CPE-assigned CVC from the respective CPE device (block 504). For instance, a first processor device of the respective CPE device may send a remote procedure call to a second processor device of the respective CPE device, the first processor device may receive the corresponding configuration file for the respective CPE device from the second processor device, the respective CPE device may extract the CPE-assigned CVC used by the respective CPE device from the corresponding configuration file, and the respective CPE device may send the information associated with the CPE-assigned CVC to the computing device 10.

In some implementations, the computing device 10 may determine that the information associated with the respective CVC matches the information associated with the respective CPE-assigned CVC (block 506) and determine that the respective CVC is used by the CPE device that uses the respective CPE-assigned CVC (block 508). In other implementations, the computing device 10 may determine that the information associated with the respective CVC does not match the information associated with the respective CPE-assigned CVC (block 510) and determine that the respective CVC is not used by the CPE device that uses the respective CPE-assigned CVC (block 512).

The operations continue with computing device 10 to generate one or more notifications (block 212). The one or more notifications may be one or more of an expiration date of each CVC, an expiration date of each CPE-assigned CVC, or a list of each CPE device and a corresponding CPE-assigned CVC for the respective CPE-device. The computing device 10 can display a dashboard on a display device based on the one or more notifications (block 514).

Figure 5:
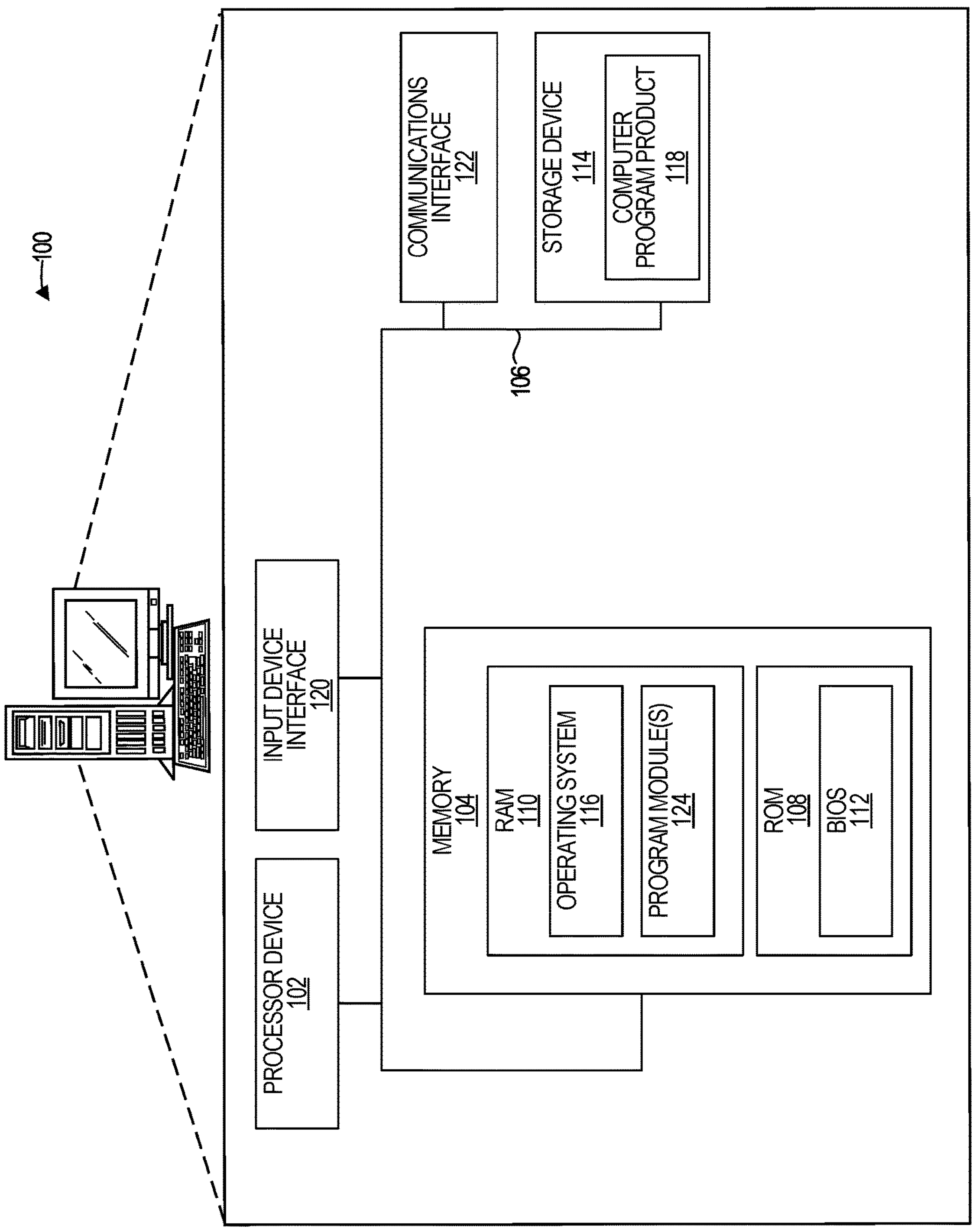
FIG. 5 is a block diagram of a computing device suitable for implementing examples, according to one example.

FIG. 5 is a block diagram of a computing device 100, such as the computing device 10 of FIG. 1, suitable for implementing examples according to one example. The computing device 100 may comprise any computing or electronic device capable of including firmware, hardware, and/or executing software instructions to implement the functionality described herein. The computing device 100 includes a processor device 102, such as the processor device 14, a system memory 104, such as the system memory 12, and a system bus 106. The system bus 106 provides an interface for system components including, but not limited to, the system memory 104 and the processor device 102. The processor device 102 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help to transfer information between elements within the computing device 100. The volatile memory 110 may also include a high-speed RAM, such as static RAM, for caching data.

The computing device 100 may further include or be coupled to a non-transitory computer-readable storage medium such as a storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116 and one or more program modules 124, which may implement the functionality described herein in whole or in part. All or a portion of the examples may be implemented as a computer program product 118 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102. The processor device 102 may serve as a controller, or control system, for the computing device 100 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 102 through an input device interface 120 that is coupled to the system bus 106 but can be connected by other interfaces such as a parallel port, an Institute of Electrical and Electronic Engineers (IEEE) 1394 serial port, a Universal Serial Bus (USB) port, an IR interface, and the like. The computing device 100 may also include a communications interface 122 suitable for communicating with the network as appropriate or desired. The computing device 100 may also include a video port (not illustrated) configured to interface with the display device (not illustrated), to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:
accessing, by a computing device from a storage device, a plurality of public keys;
converting, by the computing device, each respective public key of the plurality of public keys into a corresponding code verification certificate (CVC), wherein converting each respective public key of the plurality of public keys into the corresponding CVC comprises:
converting each respective public key from a non-readable format into a readable format;
generating an expiration date, a subject, a certificate authority from each respective public key; and
storing the expiration date, the subject, and the certificate authority in the corresponding CVC;
extracting, by the computing device from each CVC, information associated with each CVC;
obtaining, by the computing device, for each respective customer premises equipment (CPE) device of a plurality of CPE devices, a corresponding configuration file of a plurality of configuration files;
extracting, by the computing device from each respective configuration file of the plurality of configuration files, a CPE-assigned CVC used by the CPE device corresponding to the respective configuration file;
performing, by the computing device, a comparison of the information associated with each CVC and information associated with each CPE-assigned CVC; and
generating, by the computing device, one or more notifications based on the comparison.

2. The method of claim 1, wherein converting, each respective public key of the public keys into the corresponding CVC comprises:
converting each respective public key into the corresponding CVC using OpenSSL.

3. The method of claim 1, wherein obtaining, for each respective CPE device of the plurality of CPE devices, the corresponding configuration file of the plurality of configuration files comprises:
obtaining the plurality of configuration files from a server device; and
identifying the corresponding configuration file of the plurality of configuration files for the respective CPE device based on a MAC address of the respective CPE device.

4. The method of claim 1, further comprising:
sending, by a first processor device of the respective CPE device, a remote procedure call to a second processor device of the respective CPE device; and
receiving, by the first processor device, the corresponding configuration file for the respective CPE device from the second processor device.

5. The method of claim 4, further comprising:
extracting, by the respective CPE device, the CPE-assigned CVC used by the respective CPE device from the corresponding configuration file; and
sending, by the respective CPE device, the information associated with the CPE-assigned CVC to the computing device.

6. The method of claim 4, further comprising:
generating, by the respective CPE device, a notification, the notification including the information associated with the CPE-assigned CVC; and
sending, by the respective CPE device, the notification to a display device, the display device including a dashboard based on the notification.

7. The method of claim 1, wherein the information associated with each CVC comprises one or more of an expiration date, a subject, a certificate authority, or a validity of the respective CVC.

8. The method of claim 1, wherein the information associated with each CPE-assigned CVC comprises one or more of an expiration date, a subject, a corresponding CPE device, a certificate authority, or a validity of the respective CPE-assigned CVC.

9. The method of claim 1, wherein performing the comparison of the information associated with each CVC and the information associated with the respective CPE-assigned CVC comprises:

determining that the information associated with each CVC matches the information associated the respective CPE-assigned CVC; and determining that the respective CVC is used by the CPE device that uses the respective CPE-assigned CVC.

10. The method of claim 9, wherein determining that the information associated with each CVC matches the information associated with the CPE-assigned CVC comprises:

matching an expiration date, a subject, a certificate authority, and a validity of the CVC to an expiration date, a subject, a certificate authority, and a validity of the respective CPE-assigned CVC.

11. The method of claim 9, further comprising:

prior to determining that the information associated with each CVC matches the information associated with the CPE-assigned CVC, extracting, from each CPE-assigned CVC, the information associated with the respective CPE-assigned CVC.

12. The method of claim 1, wherein performing the comparison of the information associated with each CVC and the information associated with each CPE-assigned CVC comprises:

determining that the information associated with the respective CVC does not match the information associated the respective CPE-assigned CVC; and determining that the respective CVC is not used by the CPE device that uses the respective CPE-assigned CVC.

13. The method of claim 1, wherein generating the one or more notifications based the comparison comprises:

determining that a CPE-assigned CVC is expired, wherein the one or more notifications comprises a notification indicating that the CPE-assigned CVC is expired.

14. The method of claim 1, wherein the one or more notifications based on the comparison comprises an expiration date of each CVC.

15. The method of claim 1, wherein the one or more notifications based on the comparison comprises an expiration date of each CPE-assigned CVC.

16. The method of claim 1, wherein the one or more notifications based on the comparison comprises a list of each CPE device and a corresponding CPE-assigned CVC for the respective CPE device.

17. The method of claim 1, further comprising:

displaying a dashboard on a display device based on the one or more notifications.

18. The method of claim 17, wherein the dashboard comprises a list of each CVC and each CPE-assigned CVC, wherein each CVC and each CPE-assigned CVC is expired or scheduled to expire within a predetermined amount of time.

19. A computing device, comprising:

a memory;

a processor device coupled to the memory, the processor device to:

access, from a storage device, a plurality of public keys;

convert each respective public key of the plurality of public keys into a corresponding code verification certificate (CVC), wherein to convert each respective public key of the plurality of public keys into the corresponding CVC the processor device is operable to:

convert each respective public key from a non-readable format into a readable format;

generate an expiration date, a subject, a certificate authority from each respective public key; and store the expiration date, the subject, and the certificate authority in the corresponding CVC;

extract, from each CVC, information associated with each CVC;

obtain, for each respective customer premises equipment (CPE) device of a plurality of CPE devices, a corresponding configuration file of a plurality of configuration files;

extract, from each respective configuration file of the plurality of configuration files, a CPE-assigned CVC used by the CPE device corresponding to the respective configuration file;

perform a comparison of the information associated with each CVC and information associated with each CPE-assigned CVC; and generate one or more notifications based on the comparison.

20. A non-transitory computer-readable storage medium that includes computer-executable instructions that, when executed, cause one or more processor devices to:

access, from a storage device, a plurality of public keys;

convert each respective public key of the plurality of public keys into a corresponding code verification certificate (CVC), wherein to convert each respective public key of the plurality of public keys into the corresponding CVC the instructions are operable to cause the processor device to:

convert each respective public key from a non-readable format into a readable format;

generate an expiration date, a subject, a certificate authority from each respective public key; and store the expiration date, the subject, and the certificate authority in the corresponding CVC;

extract, from each CVC, information associated with each CVC;

obtain, for each respective customer premises equipment (CPE) device of a plurality of CPE devices, a corresponding configuration file of a plurality of configuration files;

extract, from each respective configuration file of the plurality of configuration files, a CPE-assigned CVC used by the CPE device corresponding to the respective configuration file;

perform a comparison of the information associated with each CVC and information associated with each CPE-assigned CVC; and generate one or more notifications based on the comparison.

21. The method of claim 1, wherein performing, by the computing device, the comparison of the information associated with each CVC and information associated with each CPE-assigned CVC further comprises:

parsing each CVC to identify one or more of an expiration date, a subject, a certificate authority, an expiration date, or a validity.

* * * * *